United States Patent
Yan et al.

(10) Patent No.: US 11,157,955 B2
(45) Date of Patent: Oct. 26, 2021

(54) SELECTING CONTENT FOR PRESENTATION TO ONLINE SYSTEM USERS BASED ON CORRELATIONS BETWEEN CONTENT ACCESSED BY USERS VIA THIRD PARTY SYSTEMS AND INTERACTIONS WITH ONLINE SYSTEM CONTENT

(71) Applicant: Facebook, Inc., Menlo Park, CA (US)

(72) Inventors: Feng Yan, Fremont, CA (US); Shyamsundar Rajaram, San Francisco, WA (US); Hao Zhang, Fremont, CA (US); Lu Zheng, Palo Alto, CA (US); Tianshi Gao, Fremont, CA (US); David Michael Viner, Belmont, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1254 days.

(21) Appl. No.: 14/662,222

(22) Filed: Mar. 18, 2015

(65) Prior Publication Data

US 2016/0275554 A1 Sep. 22, 2016

(51) Int. Cl.
*G06Q 30/00* (2012.01)
*G06Q 30/02* (2012.01)
*G05B 19/418* (2006.01)

(52) U.S. Cl.
CPC ..... *G06Q 30/0255* (2013.01); *G06Q 30/0277* (2013.01)

(58) Field of Classification Search
CPC .............. G06Q 30/0255; G06Q 30/0277
See application file for complete search history.

(56) References Cited

U.S. PATENT DOCUMENTS

| | | | | |
|---|---|---|---|---|
| 2009/0216616 | A1* | 8/2009 | Wang | G06Q 30/02 705/14.53 |
| 2011/0213655 | A1* | 9/2011 | Henkin | G06Q 30/00 705/14.49 |
| 2013/0282817 | A1* | 10/2013 | Montgomery | H04L 67/22 709/204 |

OTHER PUBLICATIONS

"An Overview of Computational Challenges in Online Advertising". IEEE. 2013. (Year: 2013).*

* cited by examiner

*Primary Examiner* — Maria V Vanderhorst

(57) ABSTRACT

An online system tracks stores information identifying content provided by third party systems and accessed by online system users as well as interactions with advertisements performed by online system users. When the online system identifies an opportunity to present an advertisement to a viewing user, the online system identifies content from third party systems accessed by the viewing user and content from third party systems accessed by additional online system users who interacted with advertisements. A score is computed for various advertisements based at least in part on correlations between content from third party systems accessed by the viewing user and content from third party systems accessed by additional online system users who interacted with advertisements. The online system selects candidate advertisements to evaluate for presentation to the viewing user based on the scores.

20 Claims, 3 Drawing Sheets

| | 435A | 435B | 435C | 435D | 435E | 435F | 435G | | 445A | 445B | 445C | 445D | 445E | 445F | 445G |
|---|---|---|---|---|---|---|---|---|---|---|---|---|---|---|---|
| User 1 | 0 | 0 | 0 | 0 | 4 | 0 | 0 | | 0 | 0 | 0 | 0 | 0 | 0 | 0 |
| User 2 | 0 | 7 | 0 | 0 | 0 | 0 | 3 | | 1 | 0 | 0 | 0 | 2 | 0 | 0 |
| User 3 | 0 | 0 | 13 | 0 | 0 | 0 | 0 | | 0 | 0 | 5 | 0 | 0 | 0 | 0 |
| User 4 | 0 | 0 | 0 | 2 | 0 | 0 | 4 | | 0 | 1 | 0 | 0 | 1 | 0 | 3 |
| User 5 | 0 | 0 | 0 | 1 | 0 | 0 | 0 | | 0 | 0 | 0 | 8 | 0 | 0 | 0 |
| User 6 | 7 | 0 | 0 | 1 | 0 | 0 | 9 | | 0 | 0 | 0 | 0 | 0 | 0 | 0 |
| User 7 | 0 | 0 | 0 | 0 | 0 | 0 | 0 | | 0 | 0 | 0 | 0 | 0 | 0 | 0 |
| User 8 | 0 | 0 | 6 | 4 | 4 | 0 | 0 | | 0 | 0 | 2 | 0 | 0 | 2 | 0 |

SELECTING CONTENT FOR PRESENTATION TO ONLINE SYSTEM USERS BASED ON CORRELATIONS BETWEEN CONTENT ACCESSED BY USERS VIA THIRD PARTY SYSTEMS AND INTERACTIONS WITH ONLINE SYSTEM CONTENT

BACKGROUND

This disclosure relates generally to online systems, and more specifically to selecting content for presentation to users of an online system.

An online system allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

The increasing popularity of online systems, such as social networking system, allows entities (e.g., businesses) to gain public attention for products or services or to persuade online system users to take actions regarding products or services provided by the entities via an online system. For example, an entity (e.g., a business) presents content items to online system users to gain public attention for products or services or to persuade online system users to take an action regarding products or services provided by the entity. Many online systems may receive compensation from an entity for presenting certain types of content items provided by the entity to online system users.

To allow an entity to particularly tailor content presented by the online system to specific online system users, the entity associates targeting criteria with content identifying characteristics of online system users eligible to be presented with the content. For example, if an entity associates content with targeting criteria identifying one or more characteristics of users eligible to be presented with the content, the online system identifies users of the online system having at least a threshold number of the one or more characteristics identified by the targeting criteria as eligible to be presented with the content and does not present the content to users that do not have at least the threshold number of the one or more criteria specified by the targeting criteria. User characteristics specified by targeting criteria may be demographic information, connections between users and other users, actions performed by the user, interests of the user, or any other suitable information maintained by the online system.

Conventionally, actions specified by targeting criteria associated with content are limited to actions performed by users through the online system or actions that are communicated to the online system for logging by third party systems. For example, a conventional online system stores interactions between its users and content presented by the online system. However, online system users interact with content and perform other actions through third party systems external to the online system that are not captured by the online system, limiting the information about online system users usable by the online system to select content for presentation to its users.

SUMMARY

An online system receives information describing content accessed by online system users via third party system through tracking mechanisms included in content provided by the third party system. For example, the online system receives information describing web pages provided by a third party system through tracking pixels embedded in the web pages provided by the third party system. When an online system user accesses content (e.g., a web page) provided by the third party system, a tracking mechanism (e.g., a tracking pixel) communicates information identifying the user of the online system and the accessed content to the online system, which stores information identifying the accessed content in association with information identifying the accessed content. For example, the online system receives a user identification number retrieved from a cookie previously communicated by the online system to an application (e.g. a browser) executing on a client device used to access the content.

Additionally, the online system maintains information describing interactions between online system users and advertisements, such as advertisements presented by the online system or presented by third party systems that communicate information to the online system. For example, the online system stores information identifying users and users' interactions with advertisements (e.g., clicks on advertisements, conversion events associated with advertisements and performed by users). In various embodiments, the online system stores information describing content from third party systems accessed by each user and interactions between each user and advertisements in a table or graph. For example, the online system maintains a table identifying various users of the online system and content provided by a third party system and a binary value associated with a user and content provided by one or more third party system indicating whether the user accessed different content; similarly, the online system maintains a table identifying users of the online system and advertisements that associates a binary value with a user and an advertisement identifying whether the user interacted with the advertisements. As an additional example, the online system stores a number of times a user accesses content from a third party system in association with information identifying the user and identifying the content; additionally, the online system stores a number of times a user accesses an advertisement in association with information identifying the advertisement and information identifying the user.

When the online system identifies an opportunity to present an advertisement to a user of the online system (i.e., a "viewing user"), the online system selects candidate advertisements to present to the user based at least in part on prior interactions with the candidate advertisements by additional users who accessed content presented by third party systems with which the viewing user also accessed. For example, candidate advertisements with which at least a threshold number of additional users who also accessed at least a threshold amount of content from one or more third party systems that the viewing user accessed are identified. In one embodiment, the online system retrieves content provided by third party systems with which the viewing user previously accessed and retrieves content provided by third party systems associated with a set of additional online system users, as well as advertisements with which the additional online systems interacted. For each advertisement with which an additional user interacted, the online system determines a score based at least in part on correlations between content provided by third party systems with which the viewing user accessed and content provided by third party systems with which additional users interacted. Based at least in part on the scores, one or more candidate advertisements are selected and included in a selection process performed by the online system to select content for presentation to the viewing user. For example, advertisements associated with at least a threshold score are selected as candidate advertisements and included in a selection process that ranks advertisements and selects one or more advertisements for presentation to the viewing user based on the ranking.

The score for an advertisement may be computed based on one or more factors including correlation between content provided by third party systems with which the viewing user interacted and content provided party systems with which additional users interacted. For example, a score for an advertisement is based on a cosine similarity between content provided by third party systems that was accessed by the viewing user and an average set of content provided by third party systems that was accessed by additional users. In some embodiments, the average set of content provided by third party systems that was accessed by additional users is based at least in part on weights associated with content provided by third party systems determined based at least in part on a number of times additional users accessed different content provided by third party systems. For example, content provided by a third party system that was accessed by additional users who interacted with more than a threshold amount of different content provided by one or more third party systems has a higher weight than content provided by a third party system that was accessed by additional users who interacted with less than the threshold amount of different content provided by the one or more third party systems when determining the average set of content provided by the third party systems that was accessed by additional users. A measure of correlation between interactions with an advertisement and access of content associated with one or more third party systems users may also be a factor in determining the score for the advertisement. For example, the 10 advertisements with which additional users who visited a web page interacted most are associated with the 10 highest scores for a viewing user that visited the web page more than a threshold number of times. The score for an advertisement may also account for a time period associated with the content provided by one or more third party systems that was previously accessed by additional users or with interactions by additional users with advertisements. For example, additional users' web page visits and advertisement interactions within a threshold time interval (e.g., 30 days from the current date) are more heavily weighted when computing the score for an advertisement than accesses to content or interactions with advertisements occurring at times outside of the threshold time interval. A score for an advertisement may also be based at least in part on interactions with the advertisement by users of the online system as a whole, such as a percentage of online system users presented with an advertisement who accessed the advertisement or who performed a specific type of action with the advertisement.

BRIEF DESCRIPTION OF THE DRAWINGS

FIG. 4 is an example table of content accessed by online system users and interactions with advertisements by online system users, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
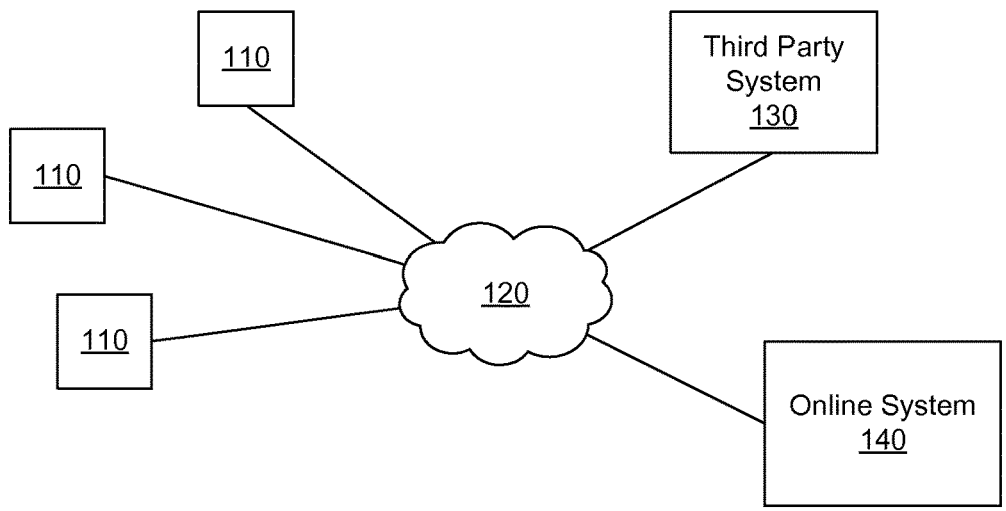
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In some embodiments, a third party system 130 includes a tracking mechanism (e.g., a tracking pixel) into content provided by the third party system 130, such as web pages. The tracking mechanism is code included in content provided by the third party system 130 that, when executed by a client device 110 presenting the content, communicates a request for content from the client device 110 to the online system 140 that includes information identifying the user to the online system 140 retrieved from the client device 110 and information describing the content from the third party system 130 that is presented. In some embodiments, different tracking mechanisms are included in different content provided by a third party system 130, such as different web pages provided by the third party system 130. For example, a third party system 130 includes different tracking pixels on different web pages provided by the third party system 130. Alternatively, a common tracking pixel is included in different web pages provided by the third party system 130. For example, a third party system 130 provides various websites that are each associated with a different tracking pixel where multiple web pages associated with a website include the tracking pixel associated with the website. A tracking mechanism included in content provided by a third party system may communicate any suitable information to the online system 140 when executed by the client device 110. Examples of information communicated by a tracking mechanism include information identifying the third party system 130 (e.g., an advertiser), information identifying the content from the third party system 130 presented, a date and time when the content from the third party system 130 was accessed, information associated with a user of the client device 110 presenting the content from the third party system 130 by the online system, etc.

Figure 2:
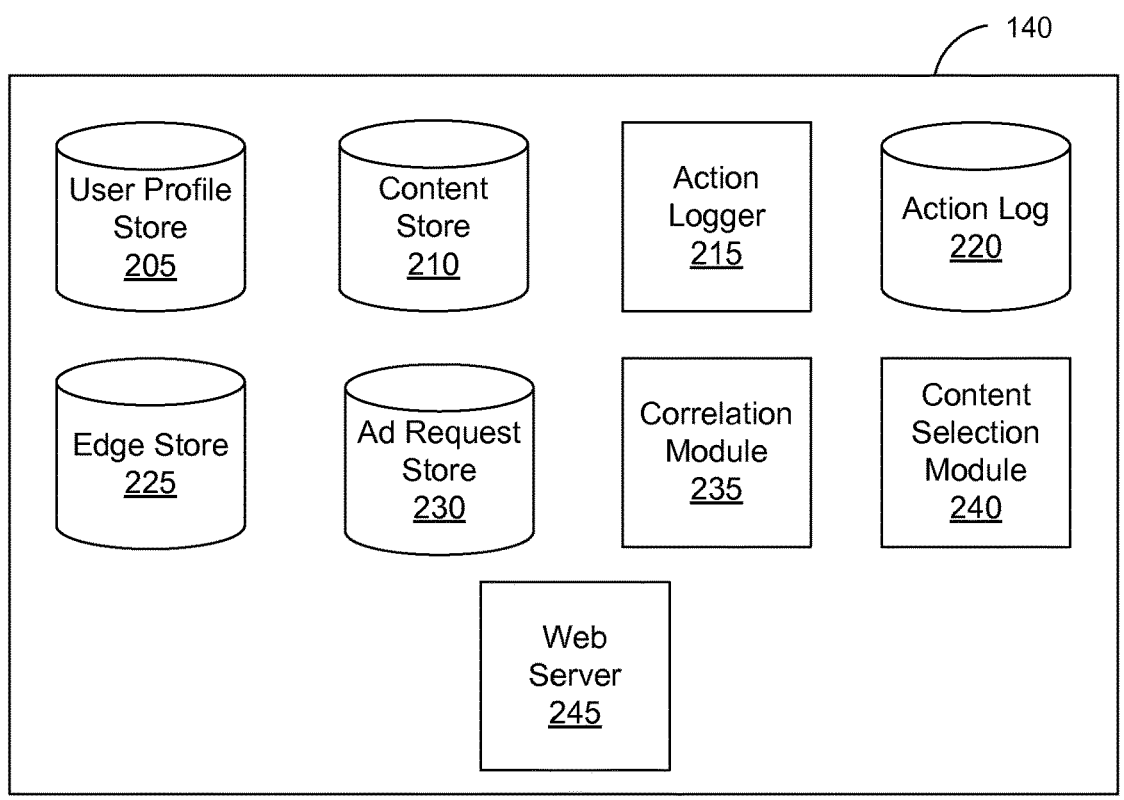
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an ad request store 230, a correlation module 235, a content selection module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. As an example, content provided by a third party system 130 to users of the online system may be identified along with information identifying an online system user 140 by information received by the online system 140, and the action logger 215 logs information identifying the content provided by the third party system 130 in the action log 220 in association with the identified user of the online system 140. For example, the action logger 215 logs information describing a number of times a user of the online system 140 accessed a web page provided by a third party system 130 as well as times the user accessed the content based on information communicated to the online system 140 by a tracking pixel, or other tracking mechanism, included in the content. Additionally, the action logger 215 logs information interactions between online system users and advertisements presented to the online system users. For example, information describing a number of times a user of the online system 140 clicked on an advertisement or completed a purchase through interacting with an advertisement is logged by the action logger 215 in association with information identifying the user; times associated with the interactions may also be stored in association with information identifying the user and identifying the advertisement. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items (including advertisements), and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Similarly, a third party system 130 may include a tracking mechanism, such as a tracking pixel, in content provided by the third party system 130. When instructions included in the tracking pixel are executed by a client device 110, information identifying a user of the online system 140 and the content provided by the third party system 130 are communicated to the online system 140, which stores information identifying the content from the third party system and the user in the action log 220. Hence, the action log 220 may record information about actions users perform on a third party system 130, including webpage viewing histories, interactions with advertisements, purchases made, and other patterns from shopping and buying.

In some embodiments, the action log 220 maintains a table or a graph including information identifying content from third party systems 130 accessed by various users and identifying interaction with various advertisements by various users. For example, the action log 220 includes a table with rows associated with different online system users and columns associated with information identifying content provided by third party systems 130, and an intersection between a row and a column in the table describes access of content associated with the column by a user associated with the row. The table may include binary data associated with combinations of a row and a column to identify whether a user corresponding to the row has accessed content associated with the column or may include a value indicating a number of times the user corresponding to the row accessed content associated with the column. As an additional example, an online system user's interactions with advertisements are logged in a graph associated with the user where an axis of the graph identifies a number of interactions and another axis of the graph identifies different advertisements, so a point in the graph represents a number of times that the user interacted with a particular advertisement. Information stored in the action log 220 describing content provided by a third party system 130 accessed by a user and interactions with advertisements may be limited to a specified time period (e.g., visits and interactions during the last month) in some embodiments. Logging accesses to content provided by third party systems 130 and interactions with advertisements is further described below in conjunction with FIG. 4.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No.

13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content, also referred to as an "advertisement," is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if advertisement content in an ad request is displayed. In some embodiments, the expected value to the online system of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, the targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The correlation module 235 determines a correlation between content provided by third party systems 130 accessed by a viewing user of the online system 140 and content provided by third party systems 130 accessed by additional users of the online system 140. For example, the correlation module 235 determines a correlation between web pages provided by one or more third party systems 130 accessed by the viewing user and web pages provided by one or more third party systems 130 accessed by additional users of the online system 140 who interacted with an advertisement. The correlation may be based on any suitable metric for measuring a similarity between content provided by one or more third party systems 130 accessed by the viewing user and content provided by one or more third party systems 130 accessed by additional users. For example, a correlation between web pages from one or more third party systems 130 accessed by a viewing user and web pages from one or more third party systems 130 accessed by additional users who accessed an advertisement is a cosine similarity between web pages from one or more third party systems 130 accessed by the viewing user and web pages from one or more third party systems 130 accessed by the additional users who accessed the advertisement. In one embodiment, the correlation module 235 determines a correlation between websites visited by the viewing user and websites visited by the additional users. The correlation module 235 may identify a set of additional users who performed a specific type of interaction with an advertisement or who performed the specific type of interaction within a threshold time interval from a current time and determine a correlation between content provided by one or more third party systems 130 with which the viewing user accessed and content provided by one or more third party systems with which the set of additional users accessed. For example, content from third party systems 130 accessed by additional users who accessed an advertisement and have a connection to the viewing user through the online system 140 is identified and used to compute the correlation to content provided by third party systems 130 and accessed by the viewing user.

When determining a correlation between content provided by one or more third party systems 130 accessed by the viewing user and content provided by one or more third party systems 130 accessed by additional users, the correlation module 235 may determine an average set of content provided by one or more third party systems 130 that was accessed by the additional users and determine correlation between content provided by one or more third party systems 130 accessed by the viewing user and the average set of content provided by one or more third party systems 130 accessed by the additional users. The average set of content accessed by the additional users may be based at least in part on weights associated with content provided by one or more third party systems 130. In some embodiments, the weights associated with content provided by one or more third party systems 130 are determined based at least in part on a number of times, or a frequency with which, additional users accessed different content provided by third party systems 130. For example, content provided by a third party system 130 that was accessed by additional users who interacted with more than a threshold amount of different content provided by one or more third party systems 130 has a higher weight than content provided by a third party system 130 that was accessed by additional users who interacted with less than the threshold amount of different content provided by the one or more third party systems 130. Hence, a weight associated with content provided by a third party system 130 may be proportional to a number of accesses to the content by additional users.

In some embodiments, when determining an average set of content provided by one or more third party systems 130 accessed by additional users who interacted with an advertisement, the correlation module 235 accounts for weights associated with the number of interactions with the advertisement by various additional users. For example, a weight associated with different content provided by one or more third party systems 130 accessed by an additional user is based at least in part on a number of times, or a frequency with which, the additional user interacted with the advertisement. The weight may be proportional to a number of times or a frequency with which the additional user interacted with the advertisement. Additionally, when determining correlation between content provided by one or more third party systems 130 accessed by the viewing user and content provided by one or more third party systems 130 accessed by additional users who interacted with an advertisement, the correlation module 235 accounts for a time period associated with the accesses to content provided by one or more third party systems 130 or associated with the interactions with the advertisement. For example, content provided by one or more third party systems 130 accessed by additional users within a threshold time interval of a current time have higher weights than content provided by one or more party systems 130 greater than the threshold time interval. Similarly, interactions with an advertisement by an additional user occurring within a threshold time interval from a current time cause content provided by one or more third party systems 130 accessed by the additional user to be more heavily weighted than content provided by one or more third party systems 130 accessed by another additional user occurring greater than the threshold time interval.

Based at least in part on the correlation between content provided by one or more third party systems 130 accessed by the viewing user and content provided by one or more third party systems 130 accessed by one or more additional users who interacted with an advertisement, the correlation module 235 determines a score for the advertisement. For example, the greater the cosine similarity between content provided by one or more third party systems 130 accessed by the viewing user and content provided by one or more third party systems 130 accessed by one or more additional users who interacted with an advertisement, the higher the score computed for the advertisement. In some embodiments, the score for an advertisement may also be determined based content provided by one or more third party systems 130 with which the viewing user accessed and interactions with the advertisement by additional users who also accessed the content provided by the one or more third party systems 130. For example, advertisements with which at least a threshold number of additional users who accessed content provided by one or more third party systems 130 with which the viewing user also accessed at least a threshold number of times have higher scores than advertisements with which additional users who accessed content provided by one or more third party systems 130 with which the viewing user accessed less than the threshold number of times. In some embodiments, the correlation module 235 accounts for overall interaction with an advertisement by users of the online system 140 when computing a score for the advertisement. For example, a score associated with an advertisement is proportional to a percentage of online system users presented with the advertisement who performed a specific type of interaction with the advertisement (e.g., accessed the advertisement, made a purchase of a product identified by the advertisement within a threshold time of interacting with the advertisement), so the greater the percentage of users performing the specific type of interaction, the greater the score for the advertisement. As an additional example, the score for an advertisement is proportional to an amount of revenue generated from purchases made by users in association with accessing the advertisement. Scoring advertisements is further described below in conjunction with FIG. 3.

The content selection module 240 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 240 includes content items eligible for presentation to the user in one or more selection processes, which identify a set of content items for presentation to the viewing user. For example, the content selection module 240 determines measures of relevance of various content items to the user based on characteristics associated with the user by the online system 140 and based on the user's affinity for different content items. Based on the measures of relevance, the content selection module 240 selects content items for presentation to the user. As an additional example, the content selection module 240 selects content items having the highest measures of relevance or having at least a threshold measure of relevance for presentation to the user. Alternatively, the content selection module 240 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 240 uses the bid amounts associated with ad requests when selecting content for presentation to the viewing user. In various embodiments, the content selection module 240 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. The content selection module 240 may rank ad requests based on their associated bid amounts and select ad requests having at least a threshold position in the ranking for presentation to the user. In some embodiments, the content selection module 240 ranks both content items not associated with bid amounts and ad requests in a unified ranking based on bid amounts associated with ad requests and measures of relevance associated with content items and ad requests. Based on the unified ranking, the content selection module 240 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 240 receives a request to present a feed of content to a user of the online system 140. The feed may include one or more advertisements from ad request as well as content items, such as stories describing actions associated with other online system users connected to the user. The content selection module 240 accesses one or more of the user profile store 205, the content store 210, the action log 220, and the edge store 225 to retrieve information about the user. For example, stories or other data associated with users connected to the identified user are retrieved. Additionally, one or more advertisement requests ("ad requests") may be retrieved from the ad request store 230 The retrieved stories, ad requests, or other content items, are analyzed by the content selection module 240 to identify candidate content that is likely to be relevant to the identified user. For example, stories associated with users not connected to the identified user or stories associated with users for which the identified user has less than a threshold affinity are discarded as candidate content. Based on various criteria, the content selection module 240 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the online system 140.

In various embodiments, the content selection module 240 presents content to a user through a newsfeed including a plurality of content items selected for presentation to the user. One or more advertisements may also be included in the feed. The content selection module 240 may also determine the order in which selected content items or advertisements are presented via the feed. For example, the content selection module 240 orders content items or advertisements in the feed based on likelihoods of the user interacting with various content items or advertisements.

The content selection module 240 identifies a set of candidate ad requests based on scores associated with advertisements in the candidate ad requests and includes the set of candidate ad requests in a selection process that selects content for presentation to the viewing user. For example, the content selection module 240 retrieves ad requests from the ad request store 230 having targeting criteria satisfied by characteristics of the viewing user and ranks the ad requests based on scores associated with advertisements in the ad requests from the correlation module 235. Ad requests having at least a threshold position in the ranking are selected as candidate ad requests, which are included in one or more selection processes by the content selection module 240. Additional factors may be used to rank the ad requests to identify the candidate ad requests in various embodiments, such as bid amounts associated with the ad requests. The content selection module 240 includes the candidate ad requests in one or more selection processes that select content for presentation to the viewing user. As further described above, a selection process may rank the candidate ad requests and other ad requests based at least in part on the bid amounts of the candidate ad requests and the other ad requests, ad requests having at least a threshold position in the ranking are then selected for presentation to the viewing user by the selection process.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS®, or BlackberryOS.

Figure 3:
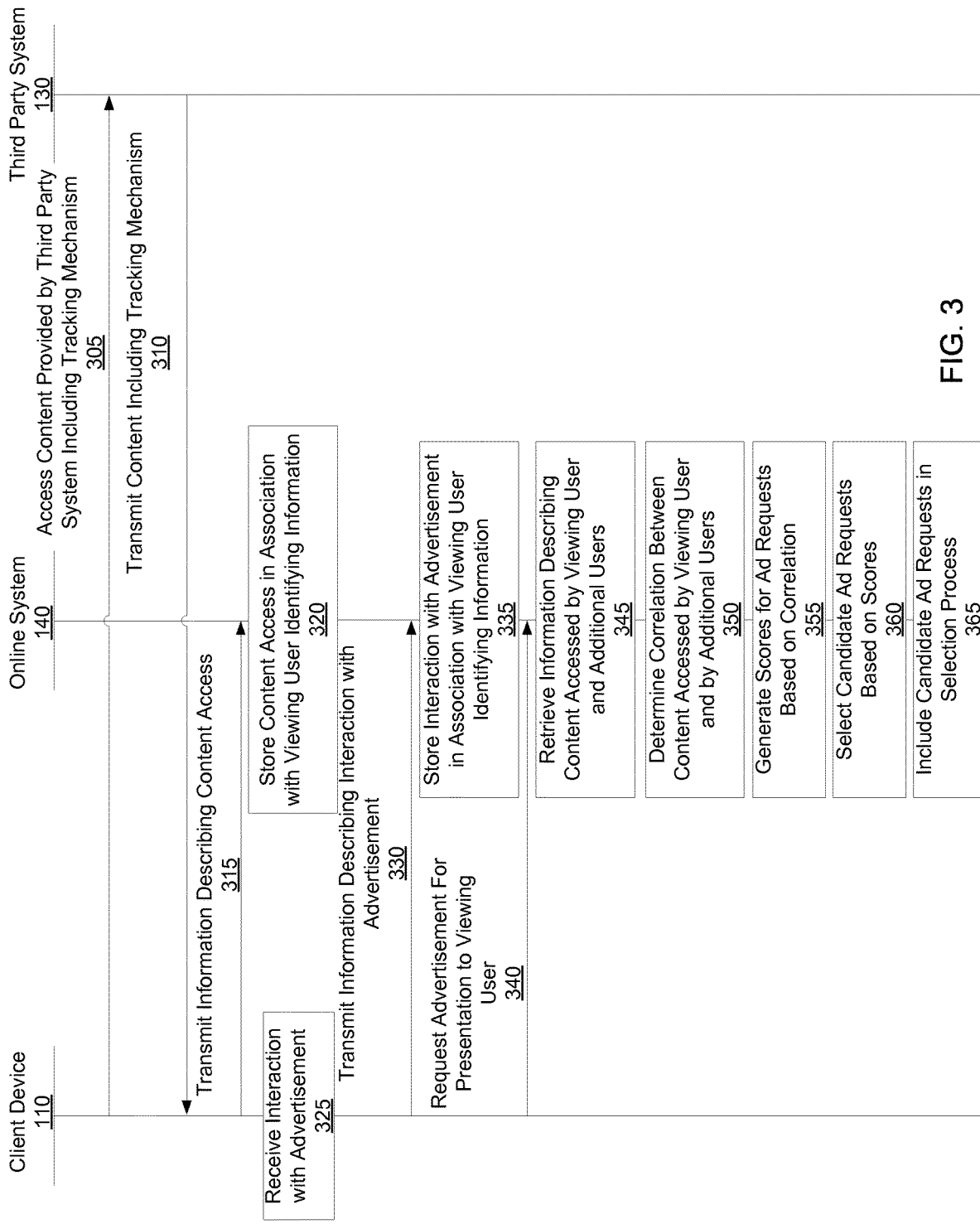
FIG. 3 is an interaction diagram of a method for logging information describing content accessed by a viewing user of an online system and selecting candidate advertisements for presentation to the viewing user in accordance with an embodiment.

Selecting Advertisements for an Online System User Based on Third Party Content Access FIG. 3 is interaction diagram of one embodiment of a method for logging information describing content accessed by a viewing user of an online system 140 and selecting candidate advertisements for presentation to the viewing user. In other embodiments, the method may include different and/or additional steps than those shown in FIG. 3. Additionally, steps of the method may be performed in different orders than the order described in conjunction with FIG. 3 in various embodiments.

A viewing user of the online system 140 accesses 305 content provided by a third party system 130 via a client device 110. The third party system 130 transmits 310 the content, which includes a tracking mechanism, to the client device 110 for presentation to the viewing user via a network 120. For example, the viewing user requests a web page provided by the third party system 130 that includes a tracking pixel or another tracking mechanism, and the third party system 130 transmits 310 the web page including the tracking pixel or other tracking mechanism to the client device 110 for presentation to the viewing user. As described above in conjunction with FIG. 2, the third party system 130 may include different tracking mechanisms in different content provided by the third party system 130 or may include a common tracking mechanism in various content provided by the third party system 130. For example, the tracking mechanism includes instructions that, when executed by the client device 110, communicate a request for content to the online system 140 that includes information associated with the online system 140 and included on the client device 110 (e.g., a cookie associated with the online system 140 stored on the client device 110) and information describing the content from the third party system 130. When the client device 110 executes the instructions included in the tracking mechanism, the client device 110 transmits 315 information stored on the client device 110 identifying the viewing user, or identifying the client device 110, to the online system 140 along with information describing the content (e.g., the web page) from the third party system 130 accessed 305 by the viewing user. Information identifying the viewing user (e.g., a user identification number or username) may be retrieved from a cookie previously communicated by the online system 140 to a browser or other application executing on the client device 110, via a social plug-in, or via any other suitable method.

The online system 140 stores 320 the information identifying the viewing user and identifying the content from the third party system 130 accessed 305 by the viewing user. For example, the online system 140 stores information identifying the viewing user in association with identifying the content from the third party system 130 and a time when the viewing user accessed 305 the content from the third party system 130. Alternatively, the client device 110 stores information identifying the viewing user, identifying the content form the third party system 130, and a time when the user accessed the content form the third party system 130 when the client device 110 executes instructions in the tracking mechanism. In some embodiments, the online system 140 requests information describing content accessed by the viewing user from the client device 110, and the client device 110 transmits 315 the information stored by the client device 110 to the online system 140 for storage. The online system 140 may request information from the client device 110 describing content accessed by the viewing user at periodic intervals, when one or more conditions are satisfied. Alternatively, the client device 110 periodically transmits 315 information stored by the client device 110 identifying content from the third party system 130, or from other third party systems 130, accessed 305 by the viewing user.

Information identifying the viewing user and the content from the third party system 130 accessed 305 by the viewing user may be stored 320 by the online system 140 in any suitable format. For example, the online system 140 maintains a table identifying different users of the online system 140 and different content provided by one or more third party systems 130 and stores information in the table corresponding to a pairing of the viewing user and the content from the third party system 130 accessed 305 by the viewing user. The information in the table may be a binary value indicating whether the viewing user accessed 305 the content from the third party system 130 or may be information identifying a number of times the viewing user accessed 305 the content from the third party system 130. As another example, the online system 140 stores a vector on a graph associated with the viewing user, where different dimensions of the vector correspond to content from one or more third party systems 130 accessed 305 by the viewing user.

Additionally, the client device 110 receives 325 an interaction by the viewing user with an advertisement presented to the user by the online system 140 or by a third party system 130 that communicates information to the online system 140 and transmits 330 information describing the interaction by the viewing user with an advertisement to the online system 140, which stores 335 information describing the interaction with the advertisement in association with information identifying the viewing user. If the advertisement with which the viewing user interacted was presented by a third party system 130, information describing the interaction may be transmitted 325 to the online system 140 via a tracking mechanism included in the advertisement, as described above, or through any suitable mechanism. For example, the online system 140 receives information identifying an advertisement with which the viewing user interacted, describing the type of interaction (e.g., clicking on the advertisement), the time of the interaction, etc. Example types of interactions with an advertisement include accessing the advertisement (e.g., clicking on the advertisement, hovering over the advertisement with a cursor for at least a threshold amount of time), sharing the advertisement, expressing a preference for the advertisement, commenting on the advertisement, purchasing a good or service associated with the advertisement after accessing the advertisement, subscribing to a service (e.g., receiving newsletters) associated with the advertisement by accessing the advertisement, and accepting an invitation associated with the advertisement by accessing the advertisement.

The online system 140 may store 335 information describing the viewing user's interaction with the advertisement in any suitable format. For example, information identifying the advertisement, the interaction by the viewing user with the advertisement, and the viewing user is stored 335 in a table or graph as described above. Information identifying the user may be retrieved by the online system 140 from a cookie associated with the online system 140 and stored on the client device 110, retrieved from the client device 110 by the online system, or obtained by the online system 140 through any suitable method.

FIG. 4 shows an example table maintained by the online system identifying content accessed provided by third party systems 130 accessed by online system users and advertisements with which online system users interacted. In the example of FIG. 4, each row of the table is associated with a different online system user. The online system 140 may use any suitable information to identify different online system users. Hence, each row in the table is associated with a unique user identifier (e.g., user identification number, username, etc.). Each column of the table is associated different content 430 provided by one or more third party systems 130 or is associated with a different advertisement 440. While FIG. 4 shows an example table including content 430 provided by third party systems 130 as well as advertisements 440, in other embodiments, different tables are maintained for content 430 provided by third party systems 130 and for advertisements 440. In other embodiments, different vectors are associated with each user describing each user's interactions with advertisements 440, where the dimensions of a vector correspond to advertisements with which a user interacted and a number of interactions with the advertisements by the user.

In the example of FIG. 4, an integer in the table at an intersection of a column and row represents a number of times that a user corresponding to the row accessed content from a third party system 130 corresponding to the column or interacted with an advertisement corresponding to the column. For example, in FIG. 4, columns 435A-435G each correspond to different content from one or more third party systems 130. As a specific example, in the table of FIG. 4, User 5 accessed content from a third party system 130 corresponding to column 435D 1 time and interacted with an advertisement corresponding to column 445D 8 times. In some embodiments, a binary value (i.e., 0 or 1) is included in the table to indicate whether or not a particular user visited particular content from a third party system 130 or interacted with a particular advertisement. For example, a value of 0 indicates that a user did not access particular content from a third party system 130 or did not interact with an advertisement while a value of 1 indicates that the user accessed the particular content from a third party system 130 or interacted with an advertisement at least once. In other embodiments, fractions or decimals may be used to represent users' accesses to content from a third party system 130 or interactions with an advertisement. For example, if 30% of a user's interactions with advertisements were with a particular advertisement, the value included in the table in association with the user and the particular advertisement is 0.3. Information stored by the online system 140 may describe content provided by one or more third party systems 130 accessed by online system users within a specified time period or advertisements with which online system users interacted within a specified time period. For example, a table includes user interactions with advertisements and content provided by one or more third party systems 130 users accessed within three months of a current date. As another example, the table includes a specified amount of content accessed by online system users (e.g., the most recent 1000 web pages accessed by different online system users) or includes a specified number of interactions with advertisements by online system users (e.g., 500 most recent interactions with advertisements)

Referring back to FIG. 3, after storing 320 information describing content provided by one or more third party systems 130 accessed by online system users and storing 335 information describing interactions with advertisements by online system users, the online system 140 identifies an opportunity to present an advertisement to the viewing user. For example, the client device 110 requests 340 an advertisement from the online system 140 for presentation to the viewing user. As described above, the online system 140 has stored 320 information describing content provided by one or more third party systems 130 accessed by the viewing user and has stored 335 information describing interactions with advertisements by the viewing user. After identifying an opportunity to present an advertisement to the viewing user, the online system 140 retrieves 345 information describing content provided by one or more third party systems 130 accessed by the viewing user and information describing content provided by one or more third party systems 130 accessed by additional users of the online system 140. In some embodiments, the online system 140 identifies a set of additional users having one or more characteristics and retrieves 345 information describing content provided by one or more third party systems 130 accessed by the additional users in the set. Example characteristics for identifying the set of additional users include a type of connection between the viewing user and the additional users, demographic information associated with the additional users, and actions performed by the additional users (e.g., types of actions, types of actions within a specified time interval, etc.). In some embodiments, the retrieved information identifies various web pages provided by one or more third party systems 130 accessed by viewing user and by the additional users. Alternatively, the retrieved information identifies different websites provided by one or more third party systems 130 accessed by the viewing user or by the additional users.

The online system 140 determines 350 a correlation between content provided by one or more third party systems 130 accessed by the viewing user and content provided by one or more third party systems 130 accessed by the additional users. To determine the correlation, the online system 140 identifies various advertisements with which additional users interacted. For each advertisement with which an additional user interacted, the online system 140 identifies content provided by one or more third party systems 130 accessed by the additional users and content provided by one or more third party systems 130 accessed by the viewing user. The correlation between content provided by one or more third party systems 130 accessed by the viewing user and content provided by the one or more third party systems 130 accessed by the additional users who interacted with an advertisement may be determined 350 based on a cosine similarity between content provided by one or more third party systems 130 accessed by the viewing user and content provided by the one or more third party systems 130 accessed by the additional users who interacted with the advertisement. However, any other suitable metric for measuring a similarity between content provided by one or more third party systems 130 accessed by the viewing user and content provided by the one or more third party systems 130 accessed by the additional users who interacted with the advertisement may be determined 350. For example, web pages provided by one or more third party systems 130 accessed by the viewing user are represented as a vector in a graph, where dimensions of the vector represent the web pages accessed by the viewing user, and web pages provided by one or more third party systems 130 accessed by additional users that interacted with an advertisement are aggregated into a vector having dimensions representing the web pages accessed by the additional users. In this example, a cosine similarity between the vector representing the web pages accessed by the viewing user and the web pages accessed by the additional users is determined 350 to represent the correlation between the web pages accessed by the viewing user and the web pages accessed by the additional users.

In some embodiments, the correlation is determined 350 based on content provided by one or more third party systems 130 accessed by a subset of additional users who interacted with an advertisement. For example, a set of additional users having performed a specific type of interaction with the advertisement are identified and content provided by one or more third party systems 130 accessed by additional users in the set is used to determine 350 the correlation. As another example, a set of additional users who interacted with the advertisement within a specified time interval, or who performed a specific type of interaction with the advertisement within a specified time interval, is identified and content provided by one or more third party systems 130 accessed by additional users in the set is used to determine 350 the correlation.

When determining 350 a correlation between content provided by one or more third party systems 130 accessed by the viewing user and content provided by one or more third party systems 130 accessed by additional users who interacted with an advertisement, the online system 140 may determine an average set of content provided by one or more third party systems 130 that was accessed by the additional users and determine 350 the correlation between content provided by one or more third party systems 130 accessed by the viewing user and the average set of content provided by one or more third party systems 130 accessed by the additional users who interacted with the advertisement. The average set of content accessed by the additional users may be based at least in part on weights associated with content provided by one or more third party systems 130. In some embodiments, weights associated with content provided by one or more third party systems 130 are determined based at least in part on a number of times, or a frequency with which, additional users accessed different content provided by third party systems 130. For example, content provided by a third party system 130 that was accessed by additional users who interacted with more than a threshold amount of different content provided by one or more third party systems 130 has a higher weight than content provided by a third party system 130 that was accessed by additional users who interacted with less than the threshold amount of different content provided by the one or more third party systems 130. Hence, a weight associated with content provided by a third party system 130 accessed by additional users may be proportional to a number of accesses to the content by additional users.

In some embodiments, when determining an average set of content provided by one or more third party systems 130 accessed by additional users who interacted with an advertisement, online system 140 determines weights associated with the number of interactions with the advertisement by various additional users. For example, a weight associated with content provided by one or more third party systems 130 accessed by an additional user is based at least in part on a number of times, or a frequency with which, the additional user interacted with the advertisement. The weight may be proportional to a number of times or a frequency with which the additional user interacted with the advertisement. Additionally, when determining 350 correlation between content provided by one or more third party systems 130 accessed by the viewing user and content provided by one or more third party systems 130 accessed by additional users who interacted with an advertisement, the online system 140 accounts for a time period associated with the accesses to content provided by one or more third party systems 130 by the additional users or associated with the interactions with the advertisement by the additional users. For example, content provided by one or more third party systems 130 accessed by at least a threshold number of additional users within a threshold time interval of a current time have higher weights than content provided by one or more party systems 130 accessed by at least a threshold number of users at times greater than the threshold time interval or than content provided by one or more third party systems 130 with which less than the threshold number of additional users accessed within the threshold time interval of the current time. Similarly, interactions with an advertisement by an additional user occurring within a threshold time interval from a current time cause content provided by one or more third party systems 130 accessed by the additional user to be more heavily weighted than content provided by one or more third party systems 130 accessed by another additional user occurring greater than the threshold time interval. Based on the weights associated with different content provided by one or more third party systems 130 accessed by the additional users, the online system 140 determines an average set of content provided by one or more third party systems 130 accessed by the additional users and determines 350 correlation between content provided by one or more third party systems 130 accessed by the viewing user and the average set of content provided by the one or more third party systems 130 accessed by the additional users.

Based on the correlation, the online system 140 generates 355 scores for advertisement ("ad") requests including advertisements with which the additional users have interacted. The score for an advertisement is based at least in part on the correlation between content provided by one or more third party systems 130 accessed by the viewing user and content provided by one or more third party systems 130 accessed by the additional users who interacted with the advertisement. For example, the greater the cosine similarity between the content provided by one or more third party systems 130 accessed by the viewing user and the content provided by one or more third party systems 130 accessed by the additional users who interacted with the advertisement, the greater the score generated 355 for the advertisement. Additional factors may be used by the online system 140 when generating 355 the score for an advertisement. For example, content provided by third party systems 130 accessed by the viewing user is used when generating 355 the score for an advertisement. For example, if the viewing user accesses content from a product page of an online merchant more frequently than content from other third party systems 130, a score of an ad request including an advertisement with which additional users who accessed product page interacted is generated 355 in part based on a percentage of the additional users who accessed the product page who also interacted with the advertisement. As an additional example, if the viewing user accesses particular web page, scores for ad requests including advertisements with which at least a threshold number or percentage of additional users who accessed the web page interacted are generated 355 based at least in part on the number of times or frequency with which the viewing user accessed the particular web page. A score generated 355 for an ad request including an advertisement may additionally be based on an overall performance of the advertisement when presented to online system users as a whole. For example, a score generated 355 for an ad request is proportional to a number or a percentage of online system users presented with an advertisement in the ad request who performed one or more types of interactions with the advertisement, so ad requests including advertisements with which a larger number or percentage of online system users presented with the advertisements interacted have higher scores. As an additional example, a score for an ad request is based at least in part on an amount of revenue to the online system from prior interaction or presentation of an advertisement included in the ad request to online system users.

Based at least in part on the scores for various ad requests, the online system 140 selects 360 candidate ad requests. For example, ad requests associated with at least a threshold score are selected 360 as candidate ad requests. As an additional example, the online system 140 ranks ad requests based on their associated scores and selects 360 ad requests having at least a threshold position in the ranking as candidate ad requests. When selecting 360 candidate ad requests, the online system 140 also accounts for targeting criteria and characteristics of the viewing user, so candidate ad requests include at least a threshold number of targeting criteria satisfied by characteristics of the viewing user, while candidate ad requests that do not include at least the threshold number of targeting criteria satisfied by characteristics of the viewing user are not selected 360 as candidate ad requests. The online system 140 includes 365 the candidate ad requests in one or more selection processes for selecting content to present to the viewing user.

For example, a selection process ranks the candidate ad requests and additional ad requests based at least in part on bid amounts included in the candidate ad requests and in the additional ad requests and selects ad requests having at least a threshold position in the ranking for presentation to the viewing user. A selection process may also account for the scores associated with the candidate ad requests when ranking ad requests. In some embodiments, the amount by which a score of a candidate ad request affects ranking of the candidate ad request is proportional to the score, so scores of candidate ad requests having higher scores are more greatly influenced by the scores. Based on the one or more selection processes, the online system 140 selects one or more ad requests for presentation to the viewing user and communicates advertisements from the selected one or more ad requests to the client device 110 for presentation to the viewing user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
providing, by an online system, a tracking pixel to one or more third party systems, the audience tracking pixel comprising code for embedding in internet-hosted content of the one or more third party systems, wherein the code is executable by a processor of a client device upon the client device accessing the internet-hosted content of the one or more third party systems;
for each of a plurality of users of the online system, receiving tracking pixel information describing each of a plurality of web pages provided by the one or more third party systems accessed by users of the plurality of users;
for each of the plurality of users, logging information describing interactions with each of a plurality of advertisements;
identifying an opportunity to present an advertisement to a viewing user of the plurality of users;
responsive to identifying the opportunity to present an advertisement to the viewing user,
retrieving information from the received tracking pixel information describing a first set of web pages accessed by the viewing user on the one or more third party systems;
determining a correlation between the first set of web pages accessed by the viewing user and a second set of web pages from the received tracking pixel information accessed by additional users of the online system who interacted with at least one advertisement of the plurality of advertisements;
selecting a set of candidate advertisement requests each including an advertisement from the at least one advertisement of the plurality of advertisements for display to the viewing user based at least in part on the determined correlation; and
including the set of candidate advertisement requests in a selection process for selecting an advertisement for display to the viewing user.

2. The method of claim 1, wherein determining the correlation between the first set of web pages accessed by the viewing user and second set of web pages from the received tracking pixel information accessed by the additional users who interacted with at least one advertisement of the plurality of advertisements comprises:
identifying a subset of the plurality of advertisements with which the additional users interacted;
retrieving, from the received tracking pixel information, information describing the second set of web pages accessed by the additional users; and
determining a metric measuring a similarity between the first set of web pages accessed by the viewing user and the second set of web pages accessed by the additional user.

3. The method of claim 2, wherein determining the metric measuring a similarity between the first set of web pages accessed by the viewing user and the one or more web pages accessed by the additional user comprises:
determining a cosine similarity between the first set of web pages accessed by the viewing user and the one or more web pages accessed by the additional user.

4. The method of claim 1, wherein determining the correlation between the first set of web pages accessed by the viewing user and second set of web pages from the received tracking pixel information accessed by the additional users who interacted with at least one advertisement of the plurality of advertisements comprises:
identifying an advertisement of the plurality of advertisements with which the additional users interacted;
retrieving information from the received tracking pixel information describing the second set of web pages accessed by the additional users;
determining an average set of content accessed by the additional users based at least in part on the retrieved information from the received tracking pixel information describing the first set of web pages accessed by the additional users; and
determining a metric measuring a similarity between the first set of web pages accessed by the viewing user and the average set of content accessed by the additional users.

5. The method of claim 4, wherein determining the average set of content accessed by the additional users based at least in part on the retrieved information from the received tracking pixel information describing the second set of web pages accessed by the additional users comprises:
determining from the retrieved information from the received tracking pixel information describing the second set of web pages accessed by the additional users a number of times each of at least a set of the additional users accessed each of the web pages in the second set of web pages;

determining weights associated with the web pages in the second set of web pages, a weight associated with a web page based at least in part on a number of times each of the at least the set of the additional users accessed the web page; and determining the average set of content based at least in part on the determined weights.

6. The method of claim 5, wherein the weight associated with the web page is proportional to the number of times each of the at least the set of the additional users accessed the web page.

7. The method of claim 4, wherein determining the average set of content accessed by the additional users based at least in part on the retrieved information from the received tracking pixel information describing the second set of web pages accessed by the additional users comprises:

determining from the retrieved information from the received tracking pixel information describing the second set of web pages accessed by the additional users a number of times each of at least a set of the additional users accessed each of the web pages;

determining weights associated with the second set of web pages, a weight associated with a web page of the second set of web pages based at least in part on times when each of the at least the set of the additional users accessed the web page; and determining the average set of content based at least in part on the determined weights.

8. The method of claim 7, wherein the weight associated with the web page is higher when at least a threshold number of times when additional users in the at least the set of the additional users accessed the web page are within a threshold time interval of a current time.

9. The method of claim 1, wherein selecting the set of candidate advertisement requests each including the advertisement from the plurality of advertisements for display to the viewing user based at least in part on the determined correlation comprises:

computing a score associated with each advertisement request including the advertisement of the plurality of advertisements based at least in part on the determined correlation; and selecting the set of candidate advertisement requests from the plurality of advertisements for display to the viewing user based at least in part on the computed scores.

10. The method of claim 9, wherein the score associated with an advertisement request is based at least in part on a correlation between the first set of web pages accessed by the viewing user and the second set of web pages from the received tracking pixel information accessed by additional users who interacted with an advertisement included in the advertisement request.

11. The method of claim 9, wherein the score associated with an advertisement request is based at least in part on a number of users of the online system presented with an advertisement included in the advertisement request who performed one or more types of interactions with the advertisement.

12. The method of claim 9, wherein the score associated with an advertisement request is based at least in part on an amount of revenue received by the online system from previously presenting an advertisement included in the advertisement request to users of the online system.

13. The method of claim 9, wherein the selection process ranks the set of candidate advertisement request based at least in part on the scores associated the candidate advertisement requests.

14. The method of claim 1, wherein the information describing interactions with an advertisement of the plurality of advertisements is selected from a group consisting of:

viewing the advertisement of the plurality of advertisements, accessing the advertisement of the plurality of advertisements, accessing one or more objects associated with advertisement of the plurality of advertisements, an indication of a purchase of a product associated with the advertisement of the plurality of advertisements after presentation of the advertisement of the plurality of advertisements, requesting one or more services associated with the advertisement of the plurality of advertisements after presentation of the advertisement of the plurality of advertisements, attending an events associated with the advertisement of the plurality of advertisements after presentation of the advertisement of the plurality of advertisements, and any combination thereof.

15. A computer program product comprising a non-transitory computer-readable storage medium having instructions encoded thereon that, when executed by a processor, cause the processor to:

provide, by an online system, a tracking pixel to one or more third party systems, the tracking pixel comprising code for embedding in internet-hosted content of the one or more third party systems, wherein the code is executable by a processor of a client device upon the client device accessing the internet-hosted content of the one or more third party systems;

for each of a plurality of users of the online system, receive tracking pixel information describing each of a plurality of web pages provided by the one or more third party systems accessed by users of the plurality of users;

for each of the plurality of users, log information describing interactions with each of a plurality of advertisements;

identify an opportunity to present an advertisement to a viewing user of the plurality of users;

retrieve information from the received tracking pixel information describing a first set of web pages accessed by the viewing user on the one or more third party systems;

determine a correlation between the first set of web pages accessed by the viewing user and a second set of web pages from the received tracking pixel information accessed by additional users of the online system who interacted with at least one advertisement of the plurality of advertisements;

select a set of candidate advertisement requests each including an advertisement from the at least one advertisement of the plurality of advertisements for display to the viewing user based at least in part on the determined correlation; and include the set of candidate advertisement requests in a selection process for selecting an advertisement for display to the viewing user.

16. The computer program product of claim 15, wherein determine the correlation between the first set of web pages accessed by the viewing user and the second set of web pages from the received tracking pixel information accessed by the additional users who interacted with at least one advertisement of the plurality of advertisements comprises:

identify an advertisement of the plurality of advertisements with which an additional user interacted;

retrieve information from the received tracking pixel information describing one or more web pages in the second set of web pages accessed by the additional user; and determine a metric measuring a similarity between the first set of web pages accessed by the viewing user and the one or more web pages accessed by the additional user.

17. The computer program product of claim 15, wherein determine the correlation between the first set of web pages accessed by the viewing user and the second set of web pages from the received tracking pixel information accessed by the additional users who interacted with at least one advertisement of the plurality of advertisements comprises:

identify an advertisement of the plurality of advertisements with which one or more additional users interacted;

retrieve information from the received tracking pixel information describing one or more web pages from the second set of web pages accessed by the one or more additional users;

determine an average set of content accessed by the one or more additional users based at least in part on the retrieved information from the received tracking pixel information describing one or more web pages accessed by the one or more additional users; and determine a metric measuring a similarity between the one or more web pages accessed by the viewing user and the average set of content accessed by the one or more additional users.

18. The computer program product of claim 17, wherein determining the average set of content accessed by the one or more additional users based at least in part on the retrieved information from the received tracking pixel information describing one or more web pages accessed by the one or more additional users comprises:

determine from the retrieved information from the received tracking pixel information describing one or more web pages accessed by the one or more additional users a number of times each of at least a set of the one or more additional users accessed each of the one or more web pages;

determine weights associated with the one or more web pages, a weight associated with a web page based at least in part on a number of times each of the at least the set of the one or more additional users accessed the web page; and determine the average set of content based at least in part on the determined weights.

19. A method comprising:

providing, by an online system, a tracking pixel to one or more third party systems, the tracking pixel comprising code for embedding in internet-hosted content of the one or more third party systems, wherein the code is executable by a processor of a client device upon the client device accessing the internet-hosted content of the one or more third party systems;

for each of a plurality of users of the online system, receiving tracking pixel information describing each of a plurality of web pages provided by the one or more third party systems accessed by users of the plurality of users;

for each of the plurality of users, logging information describing interactions with each of a plurality of advertisements;

identifying an opportunity to present an advertisement to a viewing user of the plurality of users;

responsive to identifying the opportunity to present an advertisement to the viewing user, retrieving information from the received tracking pixel information describing a first set of web pages accessed by the viewing user on the one or more third party systems;

determining a correlation between the first set of web pages accessed by the viewing user and a second set of web pages from the received tracking pixel information accessed by additional users of the online system who interacted with at least one advertisement of the plurality of advertisements, wherein determining the correlation includes:

identifying a subset of the plurality of advertisements with which the additional users of the online system interacted;

retrieving, from the received tracking pixel information, information describing the second set of web pages accessed by the additional users of the online system; and determining a cosine similarity between the first set of web pages accessed by the viewing user and the one or more web pages accessed by the additional user of the online system; and selecting a set of candidate advertisement requests each including an advertisement from the at least one advertisement of the plurality of advertisements for display to the viewing user based at least in part on the determined correlation.

20. The method of claim 19, further comprising:

including the set of candidate advertisement requests in a selection process for selecting an advertisement for display to the viewing user.

* * * * *